United States Patent
Tsutsumi

[11] Patent Number: 6,164,578
[45] Date of Patent: Dec. 26, 2000

[54] SPOOL OF SPINNING REEL FOR FISHING WITH SELECTIVE REINFORCEMENT

[75] Inventor: Wataru Tsutsumi, Saitama, Japan

[73] Assignee: Daiwa Seiko, Inc., Japan

[21] Appl. No.: 09/369,271

[22] Filed: Aug. 6, 1999

[30] Foreign Application Priority Data

Aug. 6, 1998 [JP] Japan .................................. 10-233466

[51] Int. Cl.⁷ .................................................. A01K 89/00
[52] U.S. Cl. .......................................... 242/322; D22/140
[58] Field of Search ..................................... 242/322, 224, 242/245, 246; D22/140, 141, 137

[56] References Cited

U.S. PATENT DOCUMENTS

| | | | |
|---|---|---|---|
| D. 415,550 | 10/1999 | Yamaguchi | D22/137 |
| D. 415,816 | 10/1999 | Yamaguchi | D22/137 |
| 4,289,283 | 9/1981 | Morimoto | 242/316 |
| 4,702,431 | 10/1987 | Kaneko | 242/246 |
| 4,735,375 | 4/1988 | Tunoda et al. | 242/246 |
| 5,333,813 | 8/1994 | Hirano | 242/322 |
| 5,348,245 | 9/1994 | Sugawara | 242/246 |
| 5,615,841 | 4/1997 | Saito | 242/322 X |
| 5,785,266 | 7/1998 | Bowersox | 242/322 X |
| 5,947,400 | 9/1999 | Tsutsumi | 242/322 |

FOREIGN PATENT DOCUMENTS 166668  1/1986  European Pat. Off. ............... 242/322

*Primary Examiner*—Donald P. Walsh
*Assistant Examiner*—Emmanuel M. Marcelo
*Attorney, Agent, or Firm*—Liniak, Berenato, Longacre & White

[57] ABSTRACT

In a spinning reel, a spool (2) made of synthetic resin is reinforced by an annular reinforcing member (5) made of metal such as aluminum, stainless steel or brass which is integrally fixed to the rear end of a skirt section (4) of the spool (2). The spool (2) is also reinforced by the reinforcing member (6) made of metal which is integrally fixed to the front end of the spool (2).

13 Claims, 4 Drawing Sheets

SPOOL OF SPINNING REEL FOR FISHING WITH SELECTIVE REINFORCEMENT

BACKGROUND OF THE INVENTION

The present invention relates to an improvement for a spool of a spinning reel for fishing.

In general, a spool of a spinning reel for fishing is made of synthetic resin light in weight and low in cost, or aluminum high in mechanical strength.

The weight of a spool made of synthetic resin is smaller than that of a spool made of aluminum, and the cost of the spool made of synthetic resin is lower than that of the spool made of aluminum. However, the spool made of synthetic resin is disadvantageous in that the mechanical strength is low. Therefore, when tension of a fishing line is given to the spool made of synthetic resin, the spool is bent and strain is caused in it. As a result, the skirt section is deformed and comes into contact with a rotor, so that a fishing line can not be smoothly wound. Further, when the spool is replaced with another one, it is removed from a reel body and put on a rock or bank, the spool comes into contact with the rock or bank, which causes damage in the front and the rear end section of the spool. When the spool is damaged in this way, the fishing line tends to be caught by the spool next time, and the fishing line casting resistance is increased and sometimes the fishing line is cut off. On the other hand, the spool made of aluminum is superior to the spool made of synthetic resin in the mechanical strength. However, the spool made of aluminum is disadvantageous in that the weight of the spool is increased and further it is necessary to use an expensive metallic die when the spool made of aluminum is manufactured.

SUMMARY OF THE INVENTION

The present invention has been accomplished in view of the above circumstances. It is an object of the present invention to provide a spool of a spinning reel for fishing which can solve the above problems while fully utilizing the characteristic of the spool made of synthetic resin.

The present invention provides a spool of a spinning reel for fishing comprising a reinforcing member made of metal integrally attached to a rear end section of a skirt section formed at the rear of the spool made of synthetic resin. The aforementioned spool made of synthetic resin is a spool made of synthetic resin or fiber reinforced synthetic resin, and the reinforcing member is made of metal such as aluminum, stainless steel or brass. It is preferable that the width of the overlapping section in the attaching section is 5 to 50% of the length of the skirt section. Further, holes may be formed in the reinforcing member so as to reduce the weight.

A reinforcing member made of metal such as aluminum, stainless steel or brass may be also integrally attached to the front end section of the spool made of synthetic resin so that both the front and the rear end section of the spool can be reinforced. This arrangement can prevent the spool from damaging when it is replaced, thereby reducing the casting resistance of the fishing line and enhancing the durability of the fishing line. An outer surface of the skirt section and that of the reinforcing section of the spool are preferably formed into a substantially smooth continuous face.

The present disclosure relates to the subject matter contained in Japanese patent application No. Hei. 10-233466 (filed on Aug. 6, 1998), which is expressly incorporated herein by reference in its entirety.

DESCRIPTION OF THE PREFERRED EMBODIMENT

Figure 1:
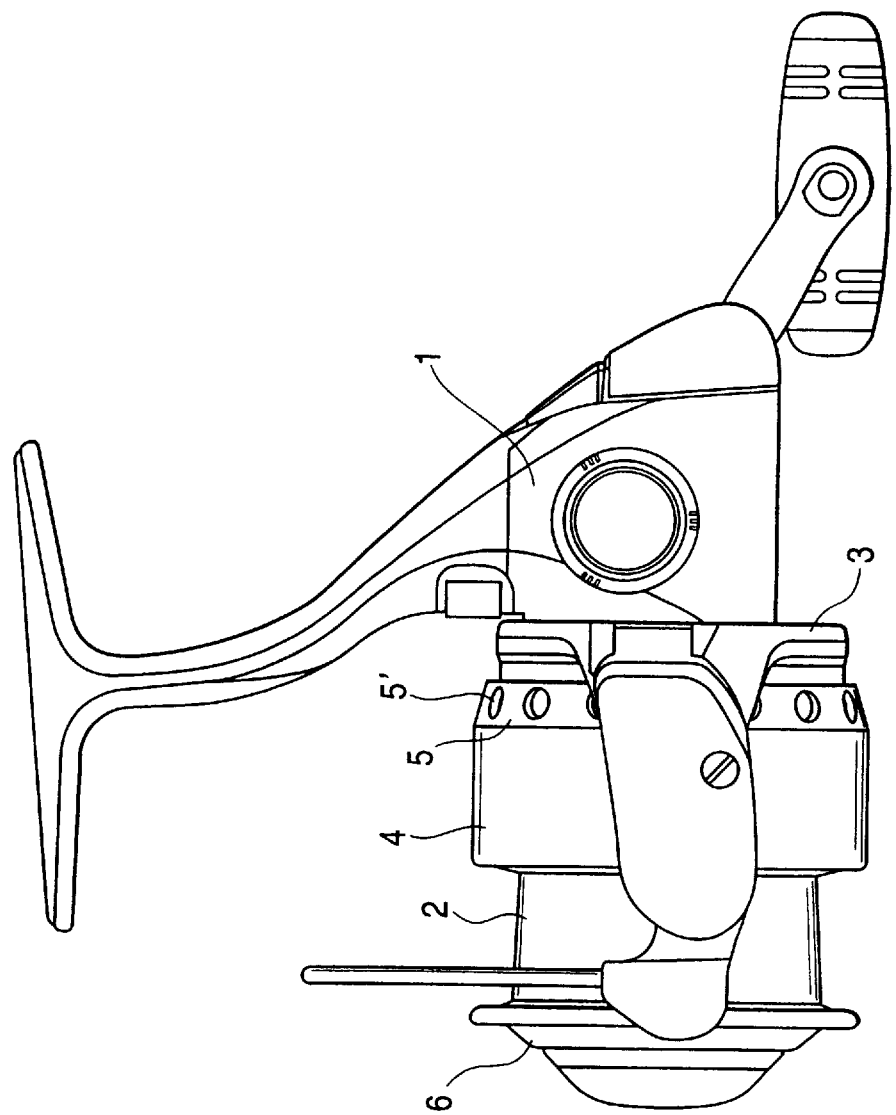
FIG. 1 is a front view of the spinning reel of the present invention.
Figure 2:
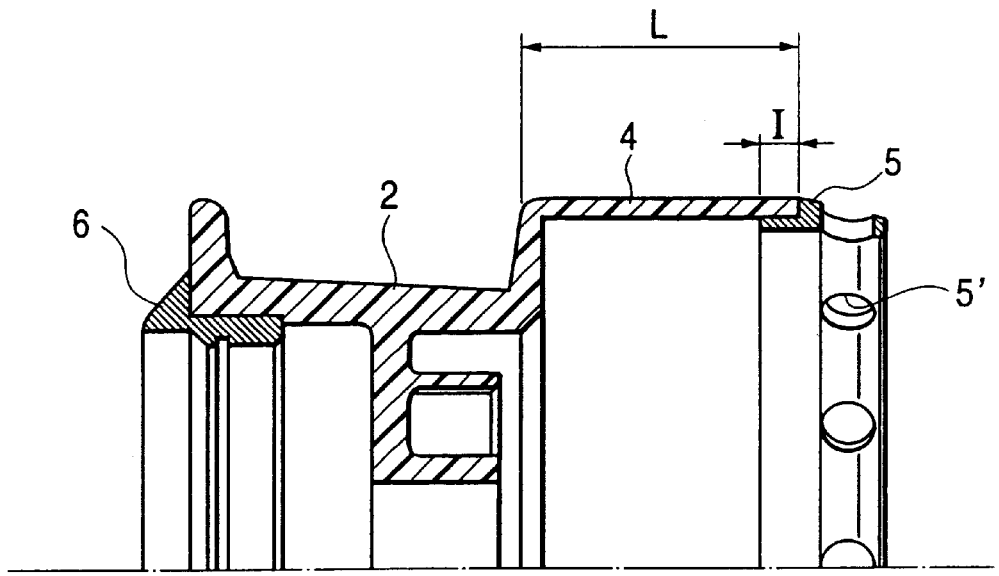
FIG. 2 is a partial longitudinal cross-sectional front view of a first embodiment of the present invention.

Embodiments of the present invention will be described with reference to the accompanying drawings. In the illustrated spinning reel, a spool 2 is supported at a front end of the reel body 1 in such a manner that it can be freely reciprocated. This spool 2 is made of synthetic resin or fiber-reinforced synthetic resin. An annular reinforcing member 5 made of metal such as aluminum, stainless steel or brass is fixed to a rear end of a skirt section 4 to be fitted onto a rotor 3 arranged rearwardly of the spool 2. On a protruding circumferential face of the annular reinforcing member 5, there are formed holes 5' so that the weight can be reduced. Width l of an overlapping section in which the annular reinforcing member 5 is engaged with or fixedly fitted to the skirt section 4 is preferably set at 5 to 50% of the entire length of the skirt section 4. The reinforcing member 5 may be fixed to the skirt section 4 by either of press-fitting and adhesion. An annular reinforcing member 6 made of metal such as aluminum, stainless steel or brass is also fixed to a front end section of the spool 2 by press-fitting or adhesion. In this way, the front end section of the spool 2 made of synthetic resin is reinforced by the reinforcing member 6.

Figure 3:
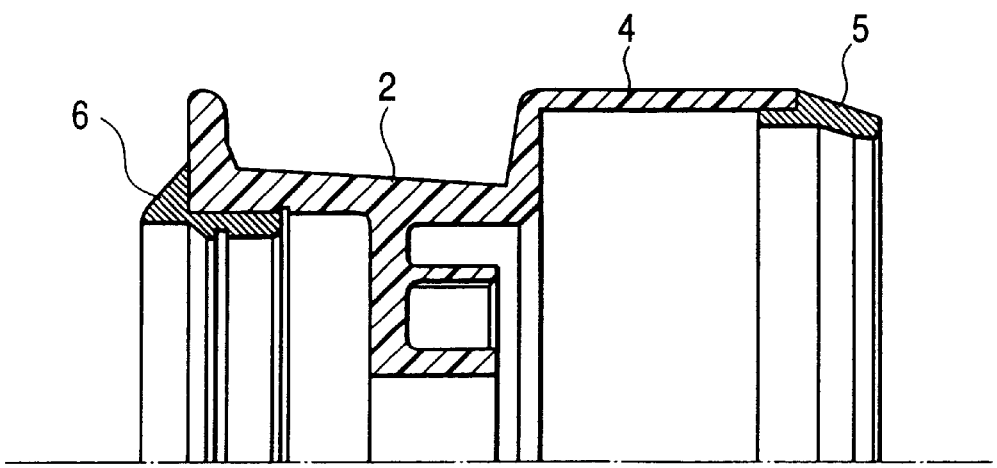
FIG. 3 is a partial longitudinal cross-sectional front view of a second embodiment of the present invention.

In the second embodiment shown in FIG. 3, no holes 5' are formed in the reinforcing member 5 of the above embodiment, and the reinforcing member 6 in the front end section is screwed to the spool 2 made of synthetic resin.

Figure 4:
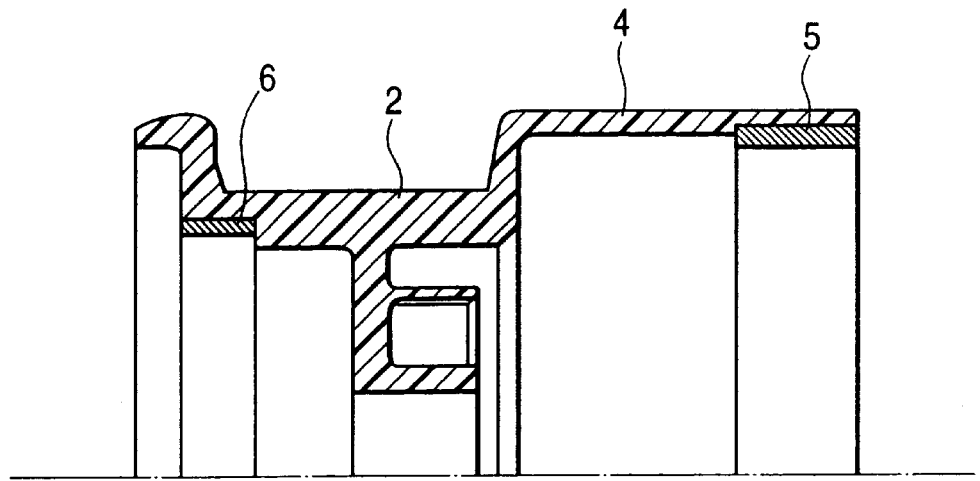
FIG. 4 is a partial longitudinal cross-sectional front view of a third embodiment of the present invention.

In the third embodiment shown in FIG. 4, the reinforcing member 5 is fixed to the inside of the rear end section of the skirt section 4 so that the reinforcing member 5 can not be exposed outside, and the reinforcing member 6 is fixed to the inside of the front end section of the spool 2 so that the reinforcing member 6 can not be exposed outside.

Figure 5:
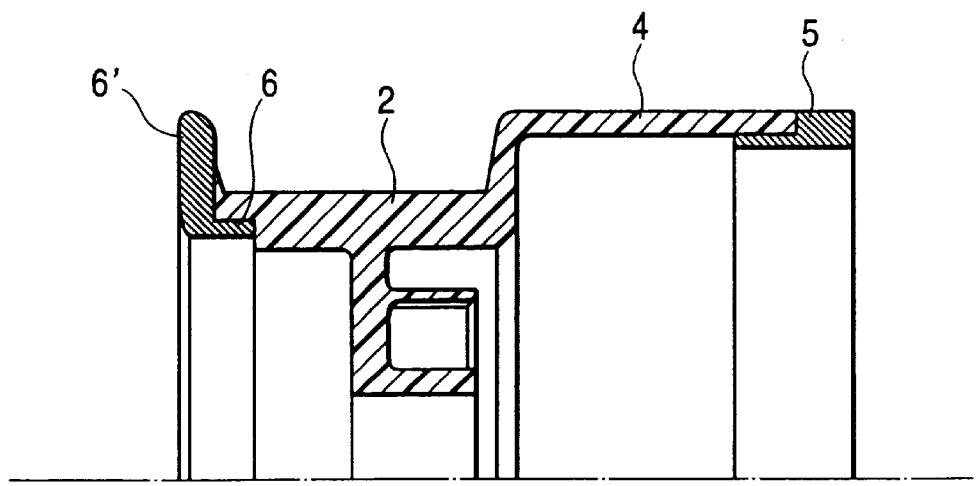
FIG. 5 is a partial longitudinal cross-sectional front view of a fourth embodiment of the present invention.

In the fourth embodiment shown in FIG. 5, the reinforcing member 5 is protruded backward so that a substantially smooth face is formed on the reinforcing member 5, which is flush with the outer surface of the skirt section 4. Also, in the fourth embodiment shown in FIG. 5, a flange 6' is formed in the reinforcing member 6 in the radial direction.

Figure 6:
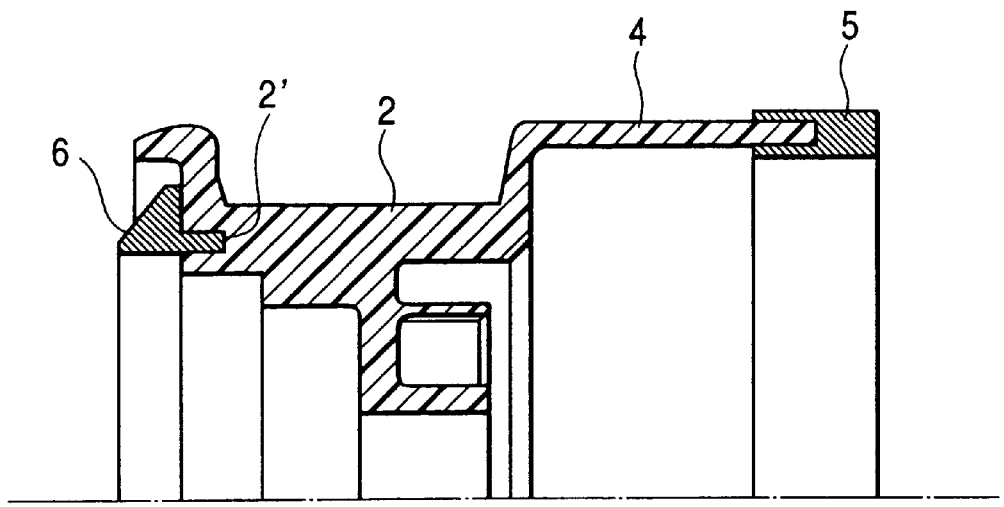
FIG. 6 is a partial longitudinal cross-sectional front view of a fifth embodiment of the present invention.

In the fifth embodiment shown in FIG. 6, the reinforcing member 5 is designed to fixedly clamp the end edge of the skirt section 4, and the reinforcing member 6 is fixedly inserted into an annular groove 2' of the spool 2.

Figure 7:
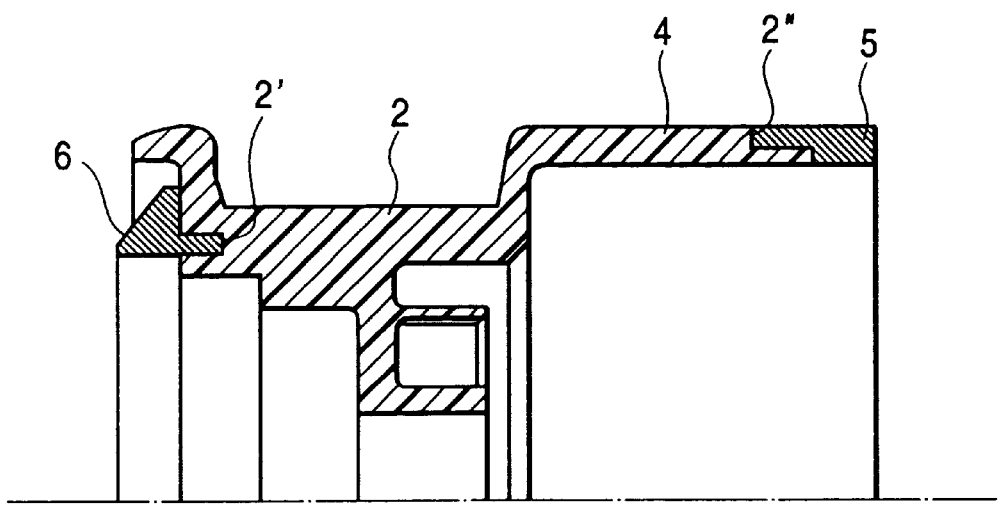
FIG. 7 is a partial longitudinal cross-sectional front view of the sixth embodiment of the present invention.

In the sixth embodiment shown in FIG. 7, the reinforcing member 5 of the fifth embodiment is engaged with an annular cutout section 2" formed in the outer circumferential section of the skirt section 4 from the outside, so that a substantially smooth continuous face is formed without any step portions between the reinforcing member 5 and each of the outer and inner circumferential faces of the skirt section 4.

The embodiments of the present invention are constructed as described above. The spool 2 is reinforced by the reinforcing member 5 made of metal which is fixed to the rear end of the skirt section 4 of the spool 2 made of synthetic resin and also by the reinforcing member 6 made of metal which is fixed to the front end of the spool 2. Due to the above structure, even if the spool 2 is put on a rock wall or a rock when it is replaced with another one, it is possible to prevent the spool 2 from being damaged. Especially, a section of the reinforcing member 5 of the skirt section 4 can be kept circular, that is, the reinforcing member 5 of the skirt section 4 can be always kept constant with respect to the rotor 3. Therefore, unlike the conventional spinning reel in which the skirt section 4 is deformed by tension of the fishing line and contacted with the rotor 3, the spinning reel of this invention can positively prevent the occurrence of such problems. Therefore, the fishing line can be smoothly and easily wound by the spinning reel.

According to the present invention, the deflection and distortion of the skirt section of the synthetic-resin-made spool are suppressed by the reinforcing member made of metal while the weight of the synthetic-resin-made spool is maintained to be low. It is possible to prevent the skirt section from coming into contact with the rotor, that is, the occurrence of problems caused in winding the fishing line can be positively prevented.

The reinforcing members made of metal are respectively fixed to the front and the rear end of the spool made of synthetic resin. These reinforcing members prevent the spool from being damaged when it is put on a rock wall or a rock. Therefore, the fishing line can be prevented from being caught, and further the casting resistance of the fishing line can be reduced as small as possible, and furthermore the fishing line can be prevented from being cut off by the flaw generated in the fishing line. In this way, durability of the fishing line can be enhanced. When the outer surfaces of the skirt section and the reinforcing member are formed into a substantially smooth continuous face, the discharging resistance of the fishing line can be further reduced and the durability can be more effectively enhanced.

When holes are formed in the reinforcing member of the skirt section and also when width of the overlapping section of the reinforcing member and the skirt section is set at 5 to 50% of the length of the skirt section, the weight of the spool can be reduced while the mechanical strength is reinforced.

What is claimed is:

1. A spool of a spinning reel for fishing, said spool comprising:

a spool body made of synthetic resin, said spool having a skirt section at a rear portion of said spool body, a first reinforcing member made of metal, said reinforcing member being integrally attached to a rear end section of said skirt section.

2. A spool of a spinning reel for fishing according to claim 1, further comprising:

a second reinforcing member made of metal, said second reinforcing member being integrally attached to a front end section of said spool.

3. A spool of a spinning reel for fishing according to claim 1, wherein a width of an overlapping section in which said first reinforcing member overlaps with said skirt section is 5 to 50% of an entire length of the skirt section.

4. A spool of a spinning reel for fishing according to claim 1, wherein an outer surface of said first reinforcing member is flush with an outer surface of said skirt section to form a substantially smooth continuous face.

5. A spool of a spinning reel for fishing comprising:

a spool body made of synthetic resin, said spool having a skirt section at a rear portion of said spool body;

a first reinforcing member made of metal, said reinforcing member being integrally attached to a rear end section of said skirt section, wherein holes are formed in said first reinforcing member.

6. A spool of a spinning reel for fishing according to claim 4, further comprising:

a second reinforcing member made of metal, said second reinforcing member being integrally attached to a front end section of said spool.

7. A spool of a spinning reel for fishing made of dissimilar materials, said spool comprising:

a spool body made of light weight synthetic resin, said spool having a skirt section extending from a rear portion of said spool body;

a first annular reinforcing member made of high strength metal secured to a rear portion of said skirt section and provided to selectively reinforce said rear portion of said skirt section.

8. The spool of a spinning reel for fishing according to claim 7, wherein said first reinforcing member made of metal is disposed radially within said skirt section and extending no further than a rear most portion of said skirt section.

9. The spool of a spinning reel for fishing according to claim 7 wherein said skirt section inclusive of said rear portion of said rear section together with said annular reinforcing member has a substantially continuous thickness in a radial direction.

10. The spool of a spinning reel for fishing according to claim 7, said spool further comprising:

a second reinforcing member made of high strength metal integrally secured to a front end section of said spool and provided to selectively reinforce said front end section.

11. The spool of a spinning reel for fishing according to claim 10, wherein said second reinforcing member has a flange portion extending radially outwardly beyond a central portion of said spool.

12. The spool of a spinning reel for fishing according to claim 10, wherein said second reinforcing member has an annular flange disposed within an annular groove formed in said front end section of said spool, wherein both inner and outer peripheral surfaces of said annular flange are confined by and adjacent to corresponding inner and outer peripheral surfaces of said annular groove.

13. The spool of a spinning reel for fishing according to claim 10, wherein said second reinforcing member has a continuously flat inner peripheral surface.

* * * * *